Sept. 6, 1932.   G. L. FERGUSON   1,875,719
BEARING LOCK
Filed May 15, 1930

INVENTOR.
Gale L. Ferguson
BY
Fay, Oberlin & Fay
ATTORNEYS.

Patented Sept. 6, 1932

1,875,719

UNITED STATES PATENT OFFICE

GALE L. FERGUSON, OF CLEVELAND, OHIO, ASSIGNOR, BY MESNE ASSIGNMENTS, TO WESTCO PUMP CORPORATION, OF DAVENPORT, IOWA, A CORPORATION OF DELAWARE

BEARING LOCK

Application filed May 15, 1930. Serial No. 452,778.

The present invention, relating as indicated to bearing locks, is more particularly directed to a locking means for a ball bearing assembly. Heretofore ball bearing mechanisms have been held in place by means of clamping or exerting pressure on the outer race of the mechanism. This means of securing the ball bearings had several consequential disadvantages in that the pressure was liable to be lessened by the attendant vibration of the shaft and resulted in movement of the ball bearing assembly.

Another disadvantage was that in order to efficiently hold the bearing assembly, excessive pressure was brought to bear on the outer race which in turn caused excessive wear in the bearing. The excessive pressure also resulted in noisy operation which is extremely unwelcome in some classes of work.

From the above it will be seen that the object of this invention is to produce an efficient unfailing means of holding the ball bearing assembly in one position.

A further object is to provide a means of holding a ball bearing assembly in such a manner that no wear is caused by the said holding means.

A still further object is to provide a means of holding a ball bearing assembly which clearly avoids all chances of becoming noisy in operation.

To the accomplishment of the foregoing and related ends, said invention then consists of the means hereinafter fully described and particularly pointed out in the claims; the annexed drawing and the following description setting forth in detail one method and one product exemplifying my invention, such disclosed procedure and product consisting, however, but one of various applications of the principle of my invention.

In said annexed drawing:—

Figure 1:
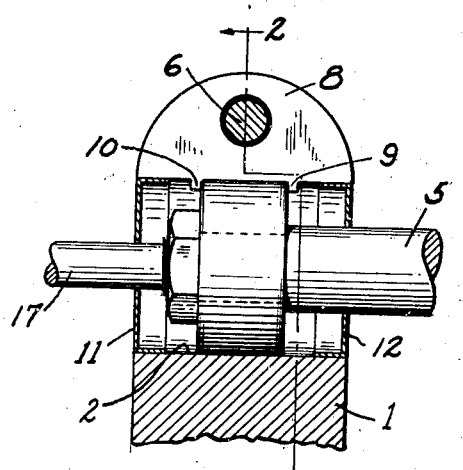
Figure 2:
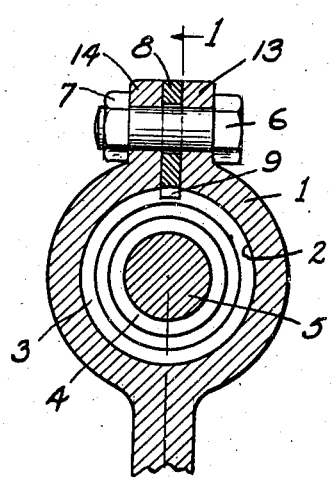
Figure 3:
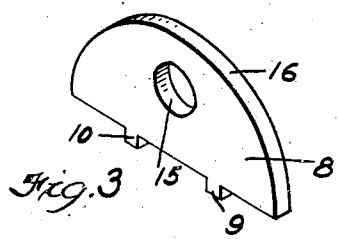

Fig. 1 is a transverse vertical section taken on the line 1—1 of Fig. 2 through a receiving member for a ball bearing assembly with certain parts in elevation; Fig. 2 is a section taken on the line 2—2 of Fig. 1; and Fig. 3 is a perspective view of my bearing lock.

The receiving member 1, shown in Figs. 1 and 2, has a bore 2 which is substantially the same as the size of the outer race 3 of the ball bearing assembly in order that the bearing will snugly fit within the opening. At the upper portion of the receiving member 1 there are two lugs 13 and 14 which are drawn toward each other by means of the headed bolt 6 and the nut 7. These two lugs are separated by a space which is approximately equal to the thickness of my bearing lock 8, such thickness being shown at 16 in Fig. 3. The shafts 5 and 17 are shown of different diameters, but it will be understood that they may be of any proportions since they serve merely for purposes of illustration, indicating one form in which a ball bearing assembly may be used. Surrounding the shafts are the cups 12 and 11 which serve to retain a lubricant about the bearing, such cups having inturned edges which serve to retain them in the bore 2 by means of friction. The bearing itself is of the conventional type and comprises an outer race 3, and an inner race 4 which, of course, have ball bearings therebetween. The bearing lock is made in the shape of a semi-circle but does not necessarily have to be so. In this instance such a shape is chosen in order to conform to the contour of the lugs 13 and 14. The bearing lock 8 has a portion removed at 15 so that the bolt 6 may be engaged thereby, and prevent movement of the bearing lock. On the lower edge of the bearing lock two small projections are shown at 9 and 10 which are spaced a distance apart which is substantially the width of the bearing race.

It will be readily observed that the lock is prevented from moving by the bolt 6, and that the tabs prevent movement of the ball bearing assembly. It will also be noted that no matter how tight the lugs 13 and 14 are drawn toward each other no pressure will be exerted on the outer race. A further advantage will be seen in that since no tightening can result, excessive wear from this source is effectually prevented. A natural result of these advantages is that the bearing can operate quietly and efficiently since the engagement of the lugs 9 and 10 on the bearing race could not, under any circumstances, cause pressure to be exerted which would result in noisy operation.

Other forms may be employed embodying the features of my invention instead of the one here explained, change being made in the form or construction, provided the element stated by any of the following claims or the equivalent of such stated elements be employed, whether produced by my preferred method or by other embodying steps equivalent to those stated in the following claims.

I claim:

1. In a ball bearing journal, the combination of a receiving member with a ball bearing assembly, and means associated with said receiving member to prevent movement of said ball bearing assembly, said means comprising a semi-circular disk having tabs.

2. In a ball bearing journal, the combination of a receiving member with a ball bearing assembly, and means associated with said receiving member to prevent movement of said ball bearing assembly, said means comprising a semi-circular disk having tabs adapted to engage said ball bearing assembly.

3. The combination in a bearing journal assembly, of a housing having a bore therein, the wall of said housing having a slot extending completely therethrough, an annular bearing mounted in said bore with a relatively small clearance, a key member positioned in said slot and having lug portions extending radially within said bore to engage and hold said bearing against longitudinal movement in said bore, and means for rigidly clamping said key member between the sides of said slot.

4. The combination in a bearing journal assembly, of a housing having a cylindrical bore therein, the wall of said housing having a slot completely therethrough, an annular anti-friction bearing mounted in said bore with a relatively small clearance, a key member positioned in said slot and having lugs thereon extending radially into said bore in overlapping relation with respect to the sides of said bearing to hold said bearing against longitudinal movement in said bore, and screw means extending through said housing and key member to locate said key member and rigidly clamp the same in place.

5. The combination in a bearing journal assembly, of a housing having a cylindrical bore therein, the wall of said housing having a slot completely therethrough, an annular anti-friction bearing mounted in said bore with a relatively small clearance, a key member positioned in said slot, said key member having a flat portion engaging the outer circumferential face of said bearing and having lugs at its opposite ends extending radially into said bore in overlapping relation with the opposite sides of said bearing to hold said bearing against axial movement in said bore, and screw means extending through said housing and key member to locate said key member and rigidly clamp the same in place, said key member also preventing excessive pressure from being exerted against said bearing by the wall of said housing.

6. The combination in a bearing journal assembly of a housing having a cylindrical bore and having a slot completely through its wall, an annular bearing mounted in said bore with a relatively small clearance, and means positioned in and rigidly clamped between the sides of said slot to prevent excessive pressure from being exerted against said bearing by said housing, said means having means thereon to locate and hold said bearing against axial movement relative to said bore.

Signed by me this 24th day of April, 1930.

GALE L. FERGUSON.